(12) United States Patent
Zohar

(10) Patent No.: US 6,996,591 B2
(45) Date of Patent: *Feb. 7, 2006

(54) SYSTEM AND METHOD TO EFFICIENTLY APPROXIMATE THE TERM $2^X$

(75) Inventor: Ronen Zohar, Gan-Ner (IL)

(73) Assignee: Intel Corporation, Santa Clara, CA (US)

( * ) Notice: Subject to any disclaimer, the term of this patent is extended or adjusted under 35 U.S.C. 154(b) by 597 days.

This patent is subject to a terminal disclaimer.

(21) Appl. No.: 09/754,040

(22) Filed: Dec. 27, 2000

(65) Prior Publication Data

US 2002/0124034 A1 Sep. 5, 2002

(51) Int. Cl.
*G06F 1/02* (2006.01)

(52) U.S. Cl. .................................................. 708/277
(58) Field of Classification Search ................ 708/277, 708/512, 517, 606
See application file for complete search history.

(56) References Cited

U.S. PATENT DOCUMENTS 6,049,343 A * 4/2000 Abe et al. .................... 345/501
6,178,435 B1 * 1/2001 Schmookler ................ 708/277

FOREIGN PATENT DOCUMENTS

JP          10207694 A  *  8/1998

* cited by examiner

*Primary Examiner*—Chuong D Ngo
(74) *Attorney, Agent, or Firm*—Blakely, Sokoloff, Taylor and Zafman

(57) ABSTRACT

The present invention relates to a system and method to efficiently approximate the term $2^X$. The system includes an approximation apparatus to approximate $2^X$, wherein X is a real number. The system further includes a memory to store a computer program that utilizes the first approximation apparatus. The system also includes a central processing unit (CPU) that is cooperatively connected to the approximation apparatus and the memory, and that executes the computer program.

27 Claims, 8 Drawing Sheets

US 6,996,591 B2

SYSTEM AND METHOD TO EFFICIENTLY APPROXIMATE THE TERM $2^X$

BACKGROUND (1) Field

The present invention relates to a system and method to efficiently approximate the term $2^X$.

(2) General Background

The function, $f(X)=2^X$ where X is a real number, is a common operation in computational applications. The term $2^X$ can be expressed using the Taylor series as follows:

$$2^X = \sum_{N=0}^{\infty} \frac{(x\ln 2)^N}{N!} \quad (1)$$

Accordingly, $2^X$ can be approximated by adding the first few elements of the sum expressed in equation (1). Since X is a real number, the process of approximating the term $2^X$ would involve floating-point operations. Because operations on floating-point data are costly in nature, an efficient technique of approximating $2^X$ would prove useful.

DETAILED DESCRIPTION

The present invention relates to a system and method to efficiently approximate the term $2^X$.

Figure 1:
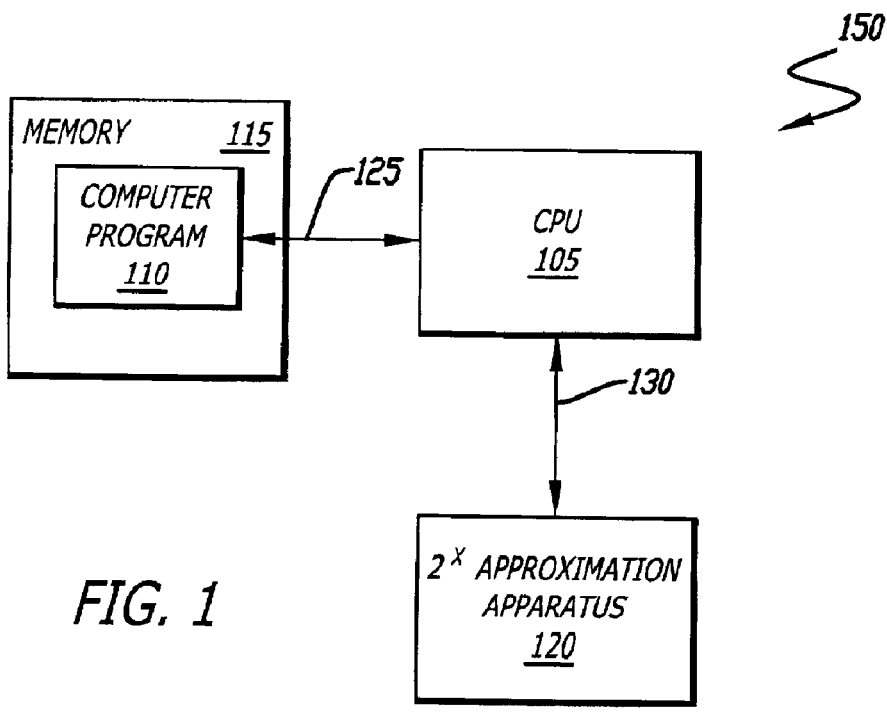
FIG. 1 is a block diagram of a computing system in accordance with one embodiment of the present invention.

FIG. 1 is an exemplary block diagram of a computing system 100 in accordance with one embodiment of the present invention. Computing system 100 includes a central processing unit (CPU) 105 and memory 115 that is cooperatively connected to the CPU 105 through data bus 125. CPU 105 is used to execute a computer program 110, which is stored in memory 115 and utilizes $2^X$-approximation apparatus 120.

CPU 105 is cooperatively connected to approximation apparatus 120 through data bus 130. Approximation apparatus 120 generally accepts as input a real number (X) which is represented in floating-point format, approximates the term $2^X$, and outputs the approximation of $2^X$. The approximation of $2^X$ is a real number represented in floating-point format.

Figure 2:
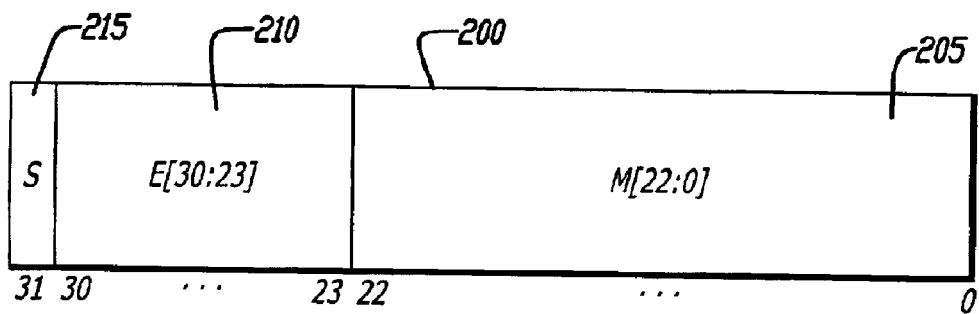
FIG. 2 shows a single precision floating-point data structure, as defined by the IEEE Standard for Binary Floating-Point Arithmetic, IEEE std. 754-1985, published Aug. 12, 1985.

FIG. 2 shows a single precision floating-point data structure 200, as defined by the IEEE Standard for Binary Floating-Point Arithmetic, IEEE std. 754-1985, published Aug. 12, 1985. A floating-point format is generally a data structure specifying the fields that comprise a floating-point numeral, the layout of those fields, and the arithmetic interpretation of those fields.

The single precision floating-point data structure 200 includes three fields: a mantissa (M) 205, an exponent (E) 210, and a sign (S) 215. In one embodiment, these three fields are stored contiguously in one 32-bit word, with bit 0 being the least significant bit and bit 31 being the most significant bit.

Bits 0 to 22 contain the 23-bit mantissa 205. Mantissa 205 generally contains the fractional portion of a real number, and is sometimes called the fraction. It should be noted that real numbers are usually normalized so that the most significant digit of the mantissa 205 is non-zero, allowing the mantissa 205 to contain the maximum possible number of significant digits.

It should also be noted that a mantissa, as defined by IEEE Standard 754, assumes a leading one (1). For example, a real number of $(1.YYYYYY \times 2^M)$—where 1.YYYYYY is a real number represented in base two (2), Y represents a digit in the fractional portion of the real number 1.YYYYYY, and M is a positive integer—is represented by a floating-point value in which YYYYYY is stored in the mantissa of the floating-point value, and M is stored in the exponent of the floating-point value. Bits 23 to 30 contain the 8-bit exponent 210. Exponent 210 is generally a binary integer representing the base two power to which the mantissa or fraction is raised. Exponents are typically represented in a biased form, in which a constant is added to the actual exponent so that the biased exponent is always a positive number. The value of the biasing constant depends on the number of bits available for representing exponents in the floating-point format being used. For example, the bias constant is 127 for the single precision floating-point format as defined by IEEE Standard 754.

Bit 31 is the sign bit 215. Sign bit 215 indicates whether the represented real number is positive or negative.

It should be noted that there are other floating-point formats, e.g., double precision, double extended precision, or the like. Descriptions of embodiments in accordance with the present invention will discuss only IEEE single precision floating-point format for illustrative purposes and to avoid obscuring the present invention. However, the embodiments described below can be modified in accordance with inventive principles of the present invention to support floating-point formats other than the IEEE Standard 754 single precision floating-point format.

Figure 3A:
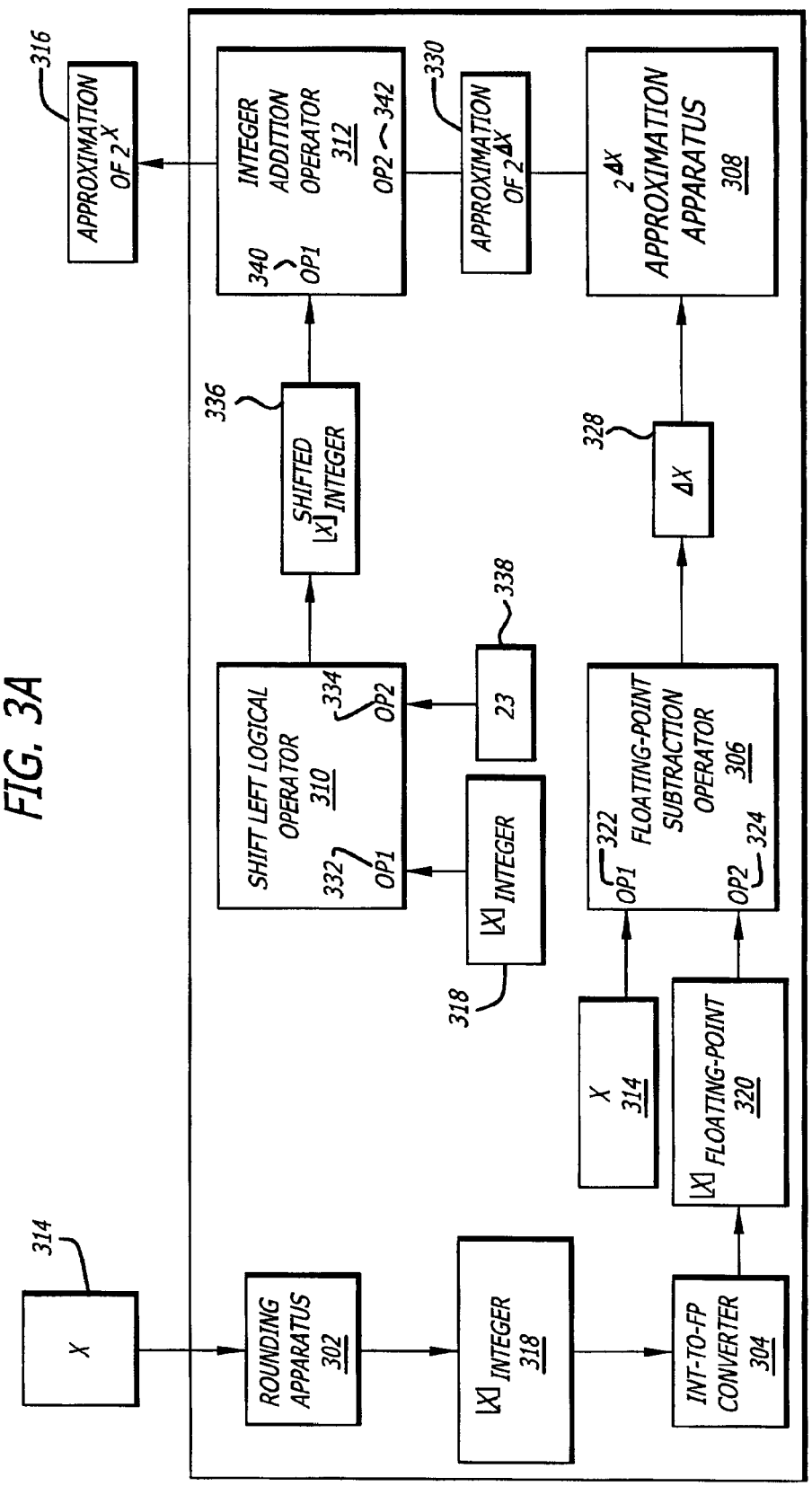
FIG. 3A is a block diagram of an apparatus to approximate the term $2^X$ in accordance with one embodiment of the present invention.

FIG. 3A is an exemplary block diagram of an apparatus 300 to approximate the term $2^X$ in accordance with one embodiment of the present invention. Approximation apparatus 300 generally receives as input a real number (X) 314 which is represented in floating-point format, approximates the term $2^X$, and outputs an approximation 316 of $2^X$. The approximation 316 of $2^X$ is represented in floating-point format.

The real number (X) 314 can be approximated using the following equation (2):

$X=\lfloor X \rfloor + \Delta X$, where $\lfloor X \rfloor$ is value of X rounded towards minus infinity $(-\infty)$ and $\Delta X$ is the fractional portion of X. (2)

As a result, $2^X$ can be approximated using the following equation (3):

$2^X = 2^{\lfloor X \rfloor + \Delta X} = 2^{\lfloor X \rfloor} \times 2^{\Delta X}$ (3)

Approximation apparatus 300 generally computes an approximation 316 of $2^X$ using the principles set forth in the aforementioned equations (2) and (3). Approximation apparatus 300 includes rounding apparatus 302, integer-to-floating-point (INT-TO-FP) converter 304, floating-point subtraction operator 306, $2^{\Delta X}$-approximation apparatus 308, shift left logical operator 310, and integer addition operator 312.

Rounding apparatus 302 is a device for rounding a real number using technique of "floor" or "rounding toward minus infinity $(-\infty)$". In the "floor" or "rounding toward minus infinity $(-\infty)$" technique, a real number would generally be rounded to the next integer. For example, +1.5 would be rounded down to 1, and −1.90 would be rounded down to ~2. A detailed description of rounding apparatus will be provided below in FIG. 5 and the text accompanying the figure.

Rounding apparatus 302 generally accepts as input a real number (X) 314, rounds the input value 314 down to the next integer in accordance with the technique of "floor" or "rounding toward minus infinity $(-\infty)$", and returns the rounded value, and outputs the rounded value, $\lfloor X \rfloor_{integer}$ 318. $\lfloor X \rfloor_{integer}$ 318 is represented in a standard integer format.

INT-to-FP converter 304 generally converts an integer represented in a standard integer format to an integer represented in floating-point format INT-to-FP converter 304 receives $\lfloor X \rfloor_{integer}$ 318 as input, and returns $\lfloor X \rfloor_{floating-point}$ 320. $\lfloor X \rfloor_{floating-point}$ 320 essentially is the value of X rounded down to the next integer in accordance with the "floor" or "rounding toward minus infinity $(-\infty)$" technique. Unlike $\lfloor X \rfloor_{integer}$ 318, $\lfloor X \rfloor_{floating-point}$ 320 is represented in floating-point format.

Floating-point subtraction operator 306 has two operands 322, 324, subtracts the second operand (OP2) 324 from the first operand (OP1) 322, and returns the result of the subtraction. X 314 is fed into floating-point subtraction operator 306 as the first operand (OP1) 322 of the operator 306. $\lfloor X \rfloor_{floating-point}$ 320 is fed into floating-point subtraction operator 306 as the second operand (OP2) 324 of the operator. Floating-point subtraction operator 306 subtracts $\lfloor X \rfloor_{floating-point}$ 320 from X 314, and returns the result 328, denoted by $\Delta X$. $\Delta X$ 328 is represented in floating point format, and is fed into $2^{\Delta X}$-approximation apparatus 308.

Approximation apparatus 308 receives $\Delta X$ 328 as input, computes an approximation 330 of $2^{\Delta X}$, and outputs the approximation 330. A detailed description of approximation apparatus 308 will be provided below in FIG. 6 and the text accompanying the figure.

Shift-left logical operator 310 has two operands 332, 334, performs a bit-wise left shift of the first operand (OP1) 332 by a predetermined number of bit positions specified by the second operand (OP2) 334, and outputs the shifted $\lfloor X \rfloor_{integer}$ value 336. $\lfloor X \rfloor_{integer}$ 318 is fed into shift-left logical operator 310 as OP1 332 of the operator 310. A shift-left bit count 338 is fed into shift-left logical operator 310 as the second operand (OP2) 334 of the operator 310. Shift-left logical operator 310 shifts $\lfloor X \rfloor_{integer}$ 318 to the left by the shift-left bit count 338. Shift-left logical operator 310 is used to shift the $\lfloor X \rfloor_{integer}$ value to the left by a predetermined number of bit positions so that the value occupies bit positions reserved for the exponent of a floating-point value.

In one embodiment supporting single precision floating-point data format as defined by IEEE Standard 754, shift-left bit count 338 has a value of twenty-three (23), and is fed into shift-left logical operator 310 as OP2 334 of the operator 310. Accordingly, shift-left logical operator 310 shifts $\lfloor X \rfloor_{integer}$ 318 to the left by twenty-three bits, and outputs the shifted $\lfloor X \rfloor_{integer}$ value 336.

It should be noted that shift count value may not be twenty-three (23) in alternative embodiments that support floating-point formats, e.g., double precision, double extended precision, or the like.

Figure 4A:
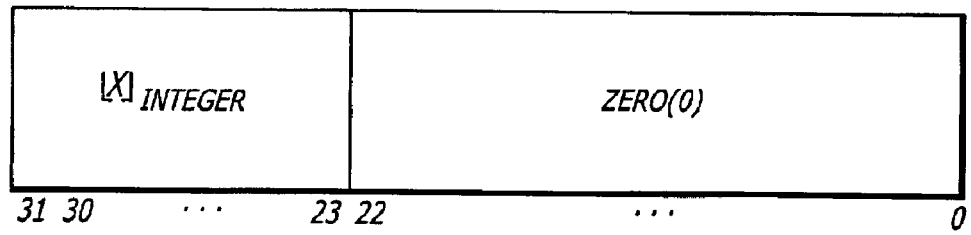
FIG. 4A shows the structure of the shifted $\lfloor X \rfloor_{integer}$ value that is the output of shift-left logical operator of FIG. 3A in accordance with one embodiment of the present invention.

FIG. 4A shows the structure 400 of the shifted $\lfloor X \rfloor_{integer}$ value that is outputted by shift-left logical operator 310 of FIG. 3A. The shifted $\lfloor X \rfloor_{integer}$ value has a 32-bit structure 400, with bit 31 being the most significant bit and bit 0 being the least significant bit. Bits 23 to 31 of the shifted $\lfloor X \rfloor_{integer}$ value will essentially contain $\lfloor X \rfloor_{integer}$ 402. Bits 0 to 22 of shifted $\lfloor X \rfloor_{integer}$ value will collectively have a value of zero (0) 404.

Returning to FIG. 3A, integer addition operator 312 has two operands (OP1 and OP2) 340, 342. Integer addition operator 312 treats the two operands 340, 342 as integers represented in a standard integer format, performs an integer addition operation to add OP2 342 to OP1 340, and outputs the sum 316. The sum 316 that integer addition operator 312 outputs is essential an approximation 316 of $2^X$.

The shifted $\lfloor X \rfloor_{integer}$ value 336, which is the output of shift-left logical operator 310, is fed into integer addition operator 312 as the first operand (OP1) 340 of the operator 312. The structure of shifted $\lfloor X \rfloor_{integer}$ value is shown above in FIG. 4A and the description of the figure.

The approximation 330 of $2^{\Delta X}$ is represented in floating-point format, and is fed into integer addition operator 312 as the second operand (OP2) 342 of the operator 312.

Figure 4B:
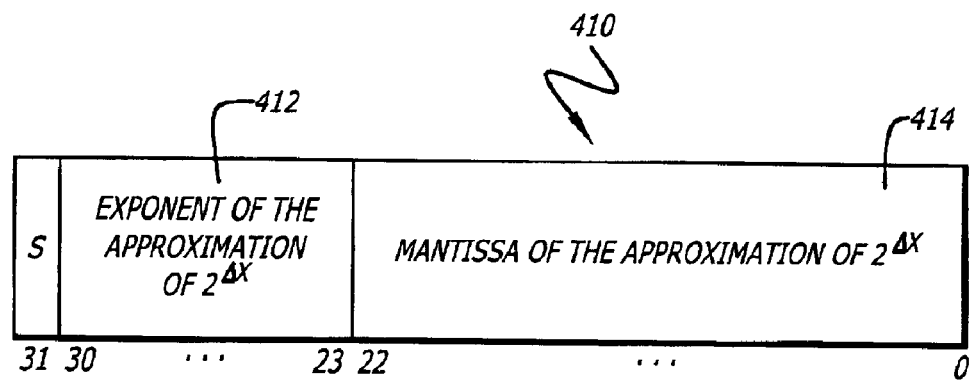
FIG. 4B illustrates the structure of the approximation of $2^{AX}$ represented in a single precision floating-point data format as defined by IEEE Standard 754.

FIG. 4B illustrates the structure 410 of the approximation of $2^{\Delta X}$ represented in a single precision floating-point data format as defined by IEEE Standard 754. Bits 23 to 31 contain the exponent 412 of the approximation of $2^{\Delta X}$, and bits 0 to 22 contain the mantissa 414 of the approximation of $2^{\Delta X}$.

Returning to FIG. 3A, integer addition operator 312 treats the shifted $\lfloor X \rfloor_{integer}$ value 336 and the approximation 330 of $2^{\Delta X}$ as integers, and performs an integer addition operation to compute their sum, even though the approximation 330 of $2^{\Delta X}$ is represented floating-point format. As a result, bits 23 to 31 of the shifted $\lfloor X \rfloor_{integer}$ value 336 are added to bits 23 to 31 of the approximation of $2^{\Delta X}$, and bits 0 to 22 of the shifted $\lfloor X \rfloor_{integer}$ value 336 are added to bits 0 to 22 of the approximation 330 of $2^{\Delta X}$.

As stated above, bits 23 to 31 of the shifted $\lfloor X \rfloor_{integer}$ value 336 contain $\lfloor X \rfloor_{integer}$, and bits 0 to 22 of the shifted $\lfloor X \rfloor_{integer}$ value 336 contain a value of zero (0). Therefore, $\lfloor X \rfloor_{integer}$ is added to the exponent of the approximation 330 of $2^{\Delta X}$, and zero (0) is added to the mantissa of the approximation 330 of $2^{\Delta X}$. By adding $\lfloor X \rfloor_{integer}$ to the exponent of the approximation 330 of $2^{\Delta X}$, integer addition operator 312 is effectively computing an approximation 316 of $2^X$ given the shifted $\lfloor X \rfloor_{integer}$ value and the approximation 330 of $2^{\Delta X}$ in accordance to equation (3), which is described above. Accordingly, the output of integer addition operator 312 is an approximation 316 of $2^X$.

In summary, approximation apparatus 300 computes an approximation of $2^X$ using the principles set forth in equations (2) and (3).

Figure 3B:
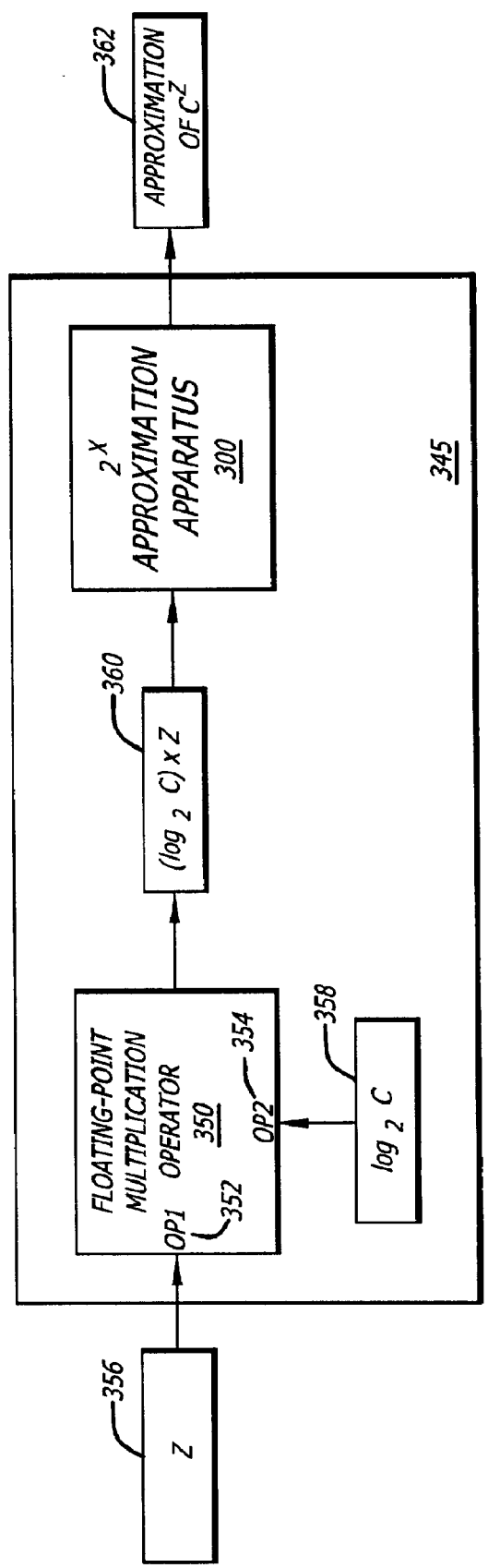
FIG. 3B is a block diagram of an apparatus to approximate the term $C^Z$, where C is a constant and a positive number and Z is a real number.

FIG. 3B is an exemplary block diagram of an apparatus 345 to approximate the term $C^Z$, where C is a constant and a positive number and Z is a real number, in accordance with one embodiment of the present invention. The term $C^Z$ can be generally expressed using the following equation (4):

$$C^Z = 2^{(\log_2 C) \times Z}. \qquad (4)$$

Approximation apparatus 345 generally receives as input a real number (Z) 358 which is represented in floating-point format, approximates the term $C^Z$ in accordance with equation (4), and outputs the approximation 362 of $C^Z$. The approximation 360 of $C^Z$ is represented in floating-point format.

Approximation apparatus 345 includes floating-point multiplication operator 350 and $2^X$ approximation apparatus 300. Floating-point multiplication operator 350 has two operands (OP1 and OP2) 352, 354. Operator 350 performs a floating-point multiplication to compute the product of OP1×OP2, and outputs the product.

The real number Z 356 is fed into floating-point multiplication operator 350 as the first operand (OP1) 352 of the operator 350. A value 358 of $\log_2 C$ is fed into floating-point multiplication operator 350 as the second operand (OP2) 354 of the operator 350. The value 358 of $\log_2 C$ is represented in floating-point format. Floating-point multiplication operator 350 multiplies the real number Z 356 by the value 358 of $\log_2 C$ and outputs the product 360 of $(\log_2 C) \times X$.

Apparatus 300 is shown in FIG. 3A and described in the text accompanying the figure. As shown in FIG. 3B, the product 360 of $(\log_2 C) \times X$. Accordingly, apparatus 300 returns an approximation of $C^Z$.

Figure 5:
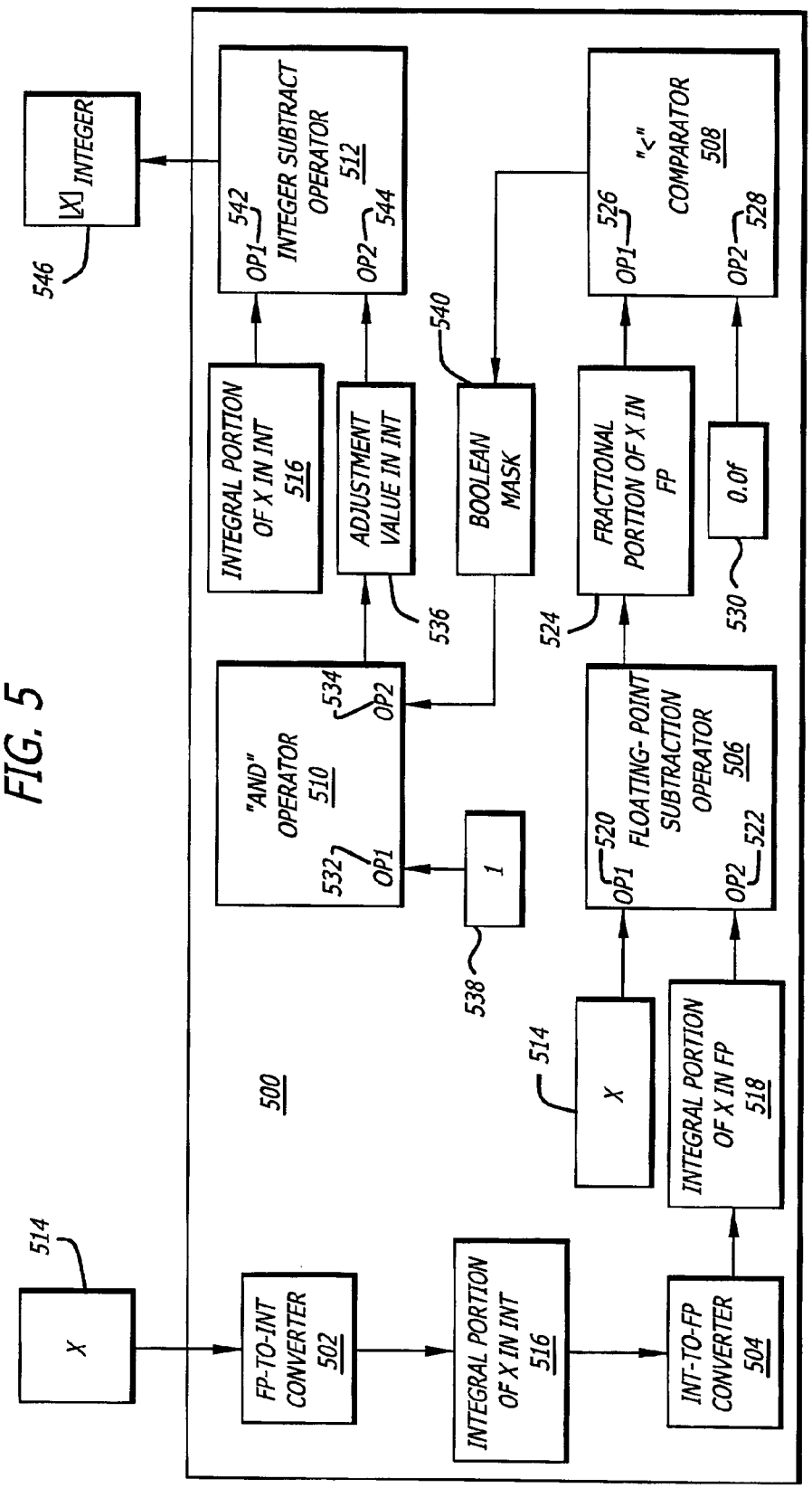
FIG. 5 is a block diagram of an apparatus for rounding real numbers using the "floor" or "rounding toward minus infinity ($-\infty$)" technique in accordance with one embodiment of the present invention.

Turning now to FIG. 5, this figure is a block diagram of an apparatus 500 for rounding real numbers using the "floor" or "rounding toward minus infinity $(-\infty)$" technique in accordance with one embodiment of the present invention. Rounding apparatus 500 generally accepts a real number (X) 514 as input, rounds the input value 514 down to the next integer, and outputs the rounded value, $\lfloor X \rfloor_{integer}$. $\lfloor X \rfloor_{integer}$ is represented in a standard integer format.

Rounding apparatus 500 includes a floating-point to integer (FP-to-INT) converter 502, an integer to floating-point (INT-to-FP) converter 504, floating-point subtraction operator 506, "less than" or "<" operator 508, "AND" operator 510, and integer subtraction operator 512.

FP-to-INT converter 502 generally converts a real number to an integer represented in a standard integer format. FP-to-INT converter 502 performs the conversion by truncating the fractional portion of the real number. Rounding apparatus 500 uses FP-to-INT converter 502 to compute the integral portion 516 of input value 514. Input value 514 is a real number represented in floating-point format, and is fed into FP-to-INT converter 502. FP-to-INT converter 502 returns the integral portion 516 of input value 514. The integral portion 516 is represented in a standard integer format.

INT-to-FP converter 504 generally converts an integer represented in a standard integer format to an integer represented in floating-point format. The output 516 of FP-to-INT converter 502 is fed into INT-to-FP converter 504. INT-to-FP converter 504 returns the integral portion 518 of input value. The integral portion 518 is represented in floating-point format.

Floating-point subtraction operator 506 has two operands 520, 522 and subtracts the second operand (OP2) 522 from the first operand (OP1) 520. Rounding apparatus 500 uses floating-point subtraction operator 506 to compute the fractional portion of input value 514. Input value 514 is represented in floating-point format and is fed into floating-point subtraction operator 506 as the first operand (OP1) 520 of the operator 506. It should be noted that the value that is fed into OP1 520 is the same value that is fed into FP-to-INT converter 502.

The output 518 of INT-to-FP converter 504 is fed into floating-point subtraction operator 506 as the second operand (OP2) 522 of the operator 506. As stated above, the output 518 of INT-to-FP converter 504 is essentially the integral portion of input value, and is represented in floating-point format. Floating-point subtraction operator 506 subtracts OP2 522 from OP1 520 to compute the fractional portion 524 of input value 514. This fractional portion 524 is represented in floating-point format.

"<" or "less-than" comparator 508 has two operands 526, 528, performs a comparison of these two operands 526, 528, and returns a boolean value 540 of TRUE or FALSE. If the first operand (OP1) 526 is less than the second operand (OP2) 528, "<" comparator 508 returns a boolean value 540 of TRUE. Otherwise, "<" comparator 508 returns a boolean value 540 of FALSE.

In one embodiment, TRUE is represented by a 32-bit mask, in which each bit of the mask has a value of "1". In this embodiment, FALSE is represented by a 32-bit mask, in which each bit of the mask has a value of "0". However, it should be noted that a 32-bit mask is used to support single precision floating point format as defined by IEEE Standard 754. Accordingly, a mask that is longer or shorter than thirty-two (32) bits would be used to support a floating-point format that is different than the single precision format. As an example, a 64-bit mask would be used to support a double precision floating-point format as defined by IEEE Standard 754. As another example, an 80-bit mask would be used to support an extended double precision floating-point format as defined by IEEE Standard 754.

The output 524 of SUBTRACT operator 520 is fed into "<" comparator 508 as the first operand (OP1) 526 of the comparator 508. A real value 530 of 0.0 is fed into "<" comparator 508 as the second operand (OP2) 528 of the comparator 508. As stated above, the output of SUBSTRACT operator 508 is essentially the fractional portion 524 of input value 514, and is represented in floating-point format. Accordingly if the fractional portion 524 of input value 514 is less than 0.0, "<" comparator 508 returns a TRUE. Otherwise, "<" comparator 508 returns a FALSE.

"AND" operator has two operands 532, 534, and returns a bit-wise logical AND of the two operands 532, 534. Rounding apparatus 500 uses "AND" operator 510 to generate an adjustment value of 0 or 1. The adjustment value 536 is represented in floating-point format, and is subtracted from the integral portion of input value to appropriately round the input value 514 in accordance with the "floor" or "rounding to minus infinity $(-\infty)$" technique.

An integer value 538 of 1 is fed into "AND" operator 510 as the first operand (OP1) 532 of the operator 534. The output 540 of "<" comparator 508 is fed into "AND" operator 510 as the second operand (OP2) 534 of the operator 510. As stated above, the output 540 of "<" comparator 508 is a boolean value. This boolean value 540 generally serves as a mask enabling "AND" operator to generate an appropriate adjustment value 536. "AND" operator 510 performs a bit-wise logical AND of OP1 532 and OP2 534, and returns an adjustment value 536. The adjustment value 536 is represented in a standard integer format and has a value of either 0 or 1.

Integer subtraction operator 512 has two operands 542, 544, and subtracts the second operand (OP2) 544 from the first operand (OP1) 542. The integral portion 516 of input value is fed into SUBTRACT operator 512 as the first operand (OP1) 542 of the operator 512. It should be noted that the integral portion 516 is represented in a standard integer format. It should also be noted that the value that is fed into OP1 542 of integer subtraction operator 512 is the output of INT-to-FP converter 504.

The output 536 of "AND" operator 510 is fed into integer subtraction operator 512 as the second operand (OP2) 544 of the subtraction operator 512. As stated above, the output 536 of "AND" operator 510 is an adjustment value of either 0 or 1.

Accordingly, integer subtraction operator 512 subtracts the adjustment value 536 from the integral portion 516 of input value, and returns the output value, $\lfloor X \rfloor_{integer}$ 546. In short, $\lfloor X \rfloor_{integer}$ 546 is the result of a "rounding to minus infinity $(-\infty)$" operation performed on the input value 514, and is represented in a standard integer format.

Figure 6:
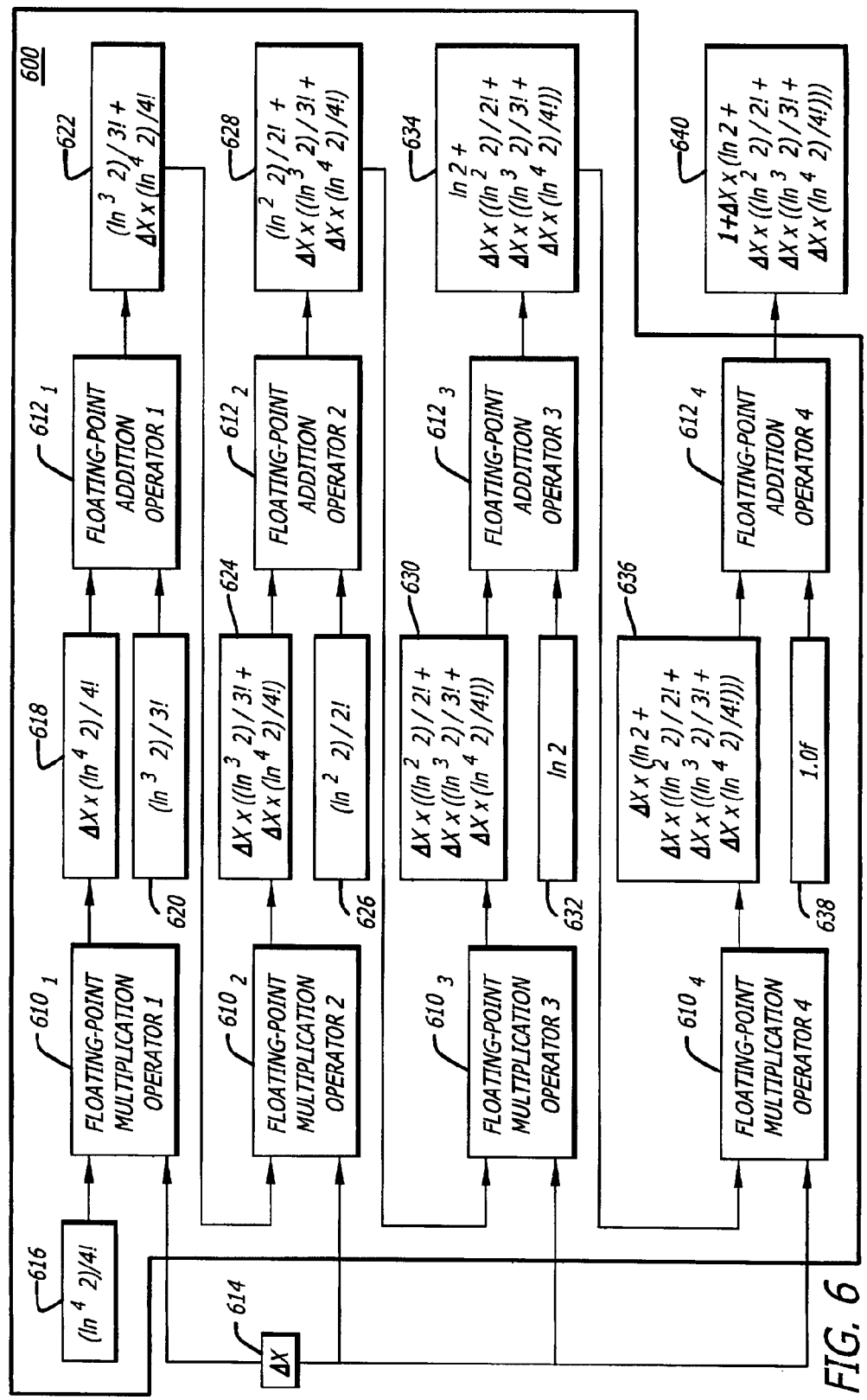
FIG. 6, this figure is a block diagram of an apparatus for approximating the term $2^{AX}$ using the first five (5) elements of the Taylor series in accordance with one embodiment of the present invention.

Turning now to FIG. 6, this figure is a block diagram of an apparatus 600 for approximating the term $2^{\Delta X}$ using the first five (5) elements of the Taylor series in accordance with one embodiment of the present invention.

The term $2^{\Delta X}$ can expressed using the Taylor series in the following equation (5):

$$2^{\Delta X} = \sum_{N=0}^{\infty} \frac{(\Delta X \ln 2)^N}{N!} \quad (5)$$

Horner's method can be used to approximate $2^{\Delta X}$ as expressed using the Taylor series in equation (5). When Horner's method is used to calculate the sum of the first five elements of the series in equation (5), the term $2^{\Delta X}$ can be expressed using the following equation (6):

$$2^{\Delta X} \cong 1 + \Delta X \times \left( \ln 2 + \Delta X \times \left( \frac{\ln^2 2}{2!} + \Delta X \times \left( \frac{\ln^3 2}{3!} + \Delta X \times \frac{\ln^4 2}{4!} \right) \right) \right), \quad (6)$$

where $\ln^n 2$ denotes $(\ln 2)^n$.

As stated above, FIG. 6 is a block diagram of an apparatus 600 for approximating the term $2^{\Delta X}$ using the first five elements of the series in equation (5). Apparatus 600 includes floating-point multiplication operators and corresponding floating-point addition operators. Each floating-point multiplication operator and its corresponding floating-point addition operator work in cooperation to compute a portion of the sum expressed in equation (6).

The embodiment illustrated in FIG. 6 shows four floating-point multiplication operators and four corresponding floating-point addition operators needed to approximate $2^{\Delta X}$ using the first five elements of the series in equation (5). However, additional floating-point multiplication and addition operators can be added to approximation apparatus 600 to approximate $2^{\Delta X}$ using six or more elements of the series in equation (5) to produce an approximation of $2^{\Delta X}$ that is more accurate that an approximation that uses five elements.

Each floating-point multiplication operator has two operands (OP1 and OP2) that are floating-point values, performs a floating-point multiplication on the operands, and returns the product. Each floating-point addition operator has two operands (OP1 and OP2) that are floating-point values, performs a floating-point addition on the operands, and returns the sum.

The values of $\Delta X$ and $$\frac{\ln^4 2}{4!},$$

614 and 616 respectively, are represented in floating-point format, and are fed into floating-point multiplication operator $610_1$ as operands of the operator $610_1$. In one embodiment supporting single precision floating-point data format as defined by IEEE Standard 754, the value 616 of $$\frac{\ln^4 2}{4!}$$

can be represented by the hexadecimal value of 0x 3c1d955b. Operator $610_1$ performs a floating-point multiplication to generate the product 618 of $$\left( \Delta X \times \frac{\ln^4 2}{4!} \right).$$

The product 618 generated by floating-point multiplication operator $610_1$ is fed into floating-point addition operator $612_1$ as one operand of the operator $612_1$. A value 620 of $$\frac{\ln^3 2}{3!}$$

is also fed into floating-point addition operator $612_1$ as another operand of the operator $612_1$. In one embodiment supporting single precision floating-point data format as defined by IEEE Standard 754, the value 620 of $$\frac{\ln^3 2}{3!}$$

can be represented by the hexadecimal value of 0x 3d635847. Operator $612_1$ performs a floating-point addition on the values 618, 620, and returns the sum 622 of $$\left( \frac{\ln^3 2}{3!} + \Delta X \times \frac{\ln^4 2}{4!} \right).$$

The sum 622 generated by floating-point addition operator $612_1$ is fed into floating-point multiplication operator $610_2$ as one operand of the operator $610_2$. The value 614 of $\Delta X$ is fed into floating-point multiplication operator $610_2$ as another operand of the operator $610_2$. Operator $610_2$ performs a floating-point multiplication on the values 614, 622 to generate the product 624 of $$\left( \Delta X \times \left( \frac{\ln^3 2}{3!} + \Delta X \times \frac{\ln^4 2}{4!} \right) \right).$$

The product 624 generated by floating-point multiplication operator $610_2$ is fed into floating-point addition operator $612_2$ as one operand of the operator $612_2$. A value 626 of $$\frac{\ln^2 2}{2!}$$

is fed into floating-point addition operator $612_2$ as another operand of the operator $612_2$. In one embodiment supporting single precision floating-point data format as defined by IEEE Standard 754, the value 626 of $$\frac{\ln^2 2}{2!}$$

can be represented by the hexadecimal value of 0x3e75fdf0. Operator $612_2$ performs a floating-point addition on the values 624, 626, and returns the sum 628 of $$\left(\frac{\ln^2 2}{2!} + \Delta X \times \left(\frac{\ln^3 2}{3!} + \Delta X \times \frac{\ln^4 2}{4!}\right)\right).$$

The sum 628 generated by floating-point addition operator $612_2$ is fed into floating-point multiplication operator $610_3$ as one operand of the operator $610_3$. The value 614 of $\Delta X$ is fed into floating-point multiplication operator $610_3$ as another operand of the operator $610_3$. Operator $610_3$ performs a floating-point multiplication on the values 614, 628 to generate the product 630 of $$\left(\Delta X \times \left(\frac{\ln^2 2}{2!} + \Delta X \times \left(\frac{\ln^3 2}{3!} + \Delta X \times \frac{\ln^4 2}{4!}\right)\right)\right).$$

The product 630 generated by floating-point multiplication operator $610_3$ is fed into floating-point addition operator $612_3$ as one operand of the operator $612_3$. A value 632 of ln 2 is fed into floating-point addition operator $612_3$ as another operand of the operator $612_3$. In one embodiment supporting single precision floating-point data format as defined by IEEE Standard 754, the value 632 of ln 2 can be represented by the hexadecimal value of 0x3f317218. Operator $612_3$ performs a floating-point addition on the values 630, 632, and returns the sum 634 of $$\left(\ln 2 + \Delta X \times \left(\frac{\ln^2 2}{2!} + \Delta X \times \left(\frac{\ln^3 2}{3!} + \Delta X \times \frac{\ln^4 2}{4!}\right)\right)\right).$$

The sum 634 generated by floating-point addition operator $612_3$ is fed into floating-point multiplication operator $610_4$ as one operand of the operator $610_4$. The value 614 of $\Delta X$ is fed into floating-point multiplication operator $610_4$ as another operand of the operator $610_4$. Operator $610_4$ performs a floating-point multiplication on the values 614, 634 to generate the product 636 of $$\left(\Delta X \times \left(\ln 2 + \Delta X \times \left(\frac{\ln^2 2}{2!} + \Delta X \times \left(\frac{\ln^3 2}{3!} + \Delta X \times \frac{\ln^4 2}{4!}\right)\right)\right)\right).$$

The product 636 generated by floating-point multiplication operator $610_4$ is fed into floating-point addition operator $612_4$ as one operand of the operator $612_4$. A real value 638 of 1.0 is fed into floating-point addition operator $612_4$ as another operand of the operator $612_4$. In one embodiment supporting single precision floating-point data format as defined by IEEE Standard 754, the value 638 of 1.0 can be represented by the hexadecimal value of 0x3f800000. Operator $612_4$ performs a floating-point addition on the values 636, 638, and returns the sum 640 of $$\left(1 + \Delta X \times \left(\ln 2 + \Delta X \times \left(\frac{\ln^2 2}{2!} + \Delta X \times \left(\frac{\ln^3 2}{3!} + \Delta X \times \frac{\ln^4 2}{4!}\right)\right)\right)\right).$$

The sum 640 generated by addition operator 610 is an approximation of $2^{\Delta X}$ as defined in equation (6).

It should be noted that the above description of the $2^{\Delta X}$-approximation apparatus 600 was given in the context of supporting the single precision floating-point data format as defined by IEEE Standard 754. Therefore, hexadecimal values of 0x3f800000, 3xc1d955b, 0x3d635847, 0x3e75fdf0, and 0x3f317218 were used to represent the values of 1.0, $$\frac{\ln^2 2}{2!}, \frac{\ln^3 2}{3!}, \text{ and } \frac{\ln^4 2}{4!},$$

respectively. However, a different set of hexadecimal values can be used to support floating-point formats other than the single precision floating-point format defined by IEEE Standard 754.

It should also be noted that the functional components, as shown in FIGS. 3A, 3B, 5, and 6 and described in the text accompanying the figures, can be implemented in hardware. The functional components can also be implemented using software code segments, where each of the code segments includes one or more assembly instructions. If the functional components are implemented using software code segments, these code segments can be stored on a machine-readable medium, such as floppy disk, hard drive, CD-ROM, DVD, tape, memory, or any storage device that is accessible by a machine.

Figure 7A:
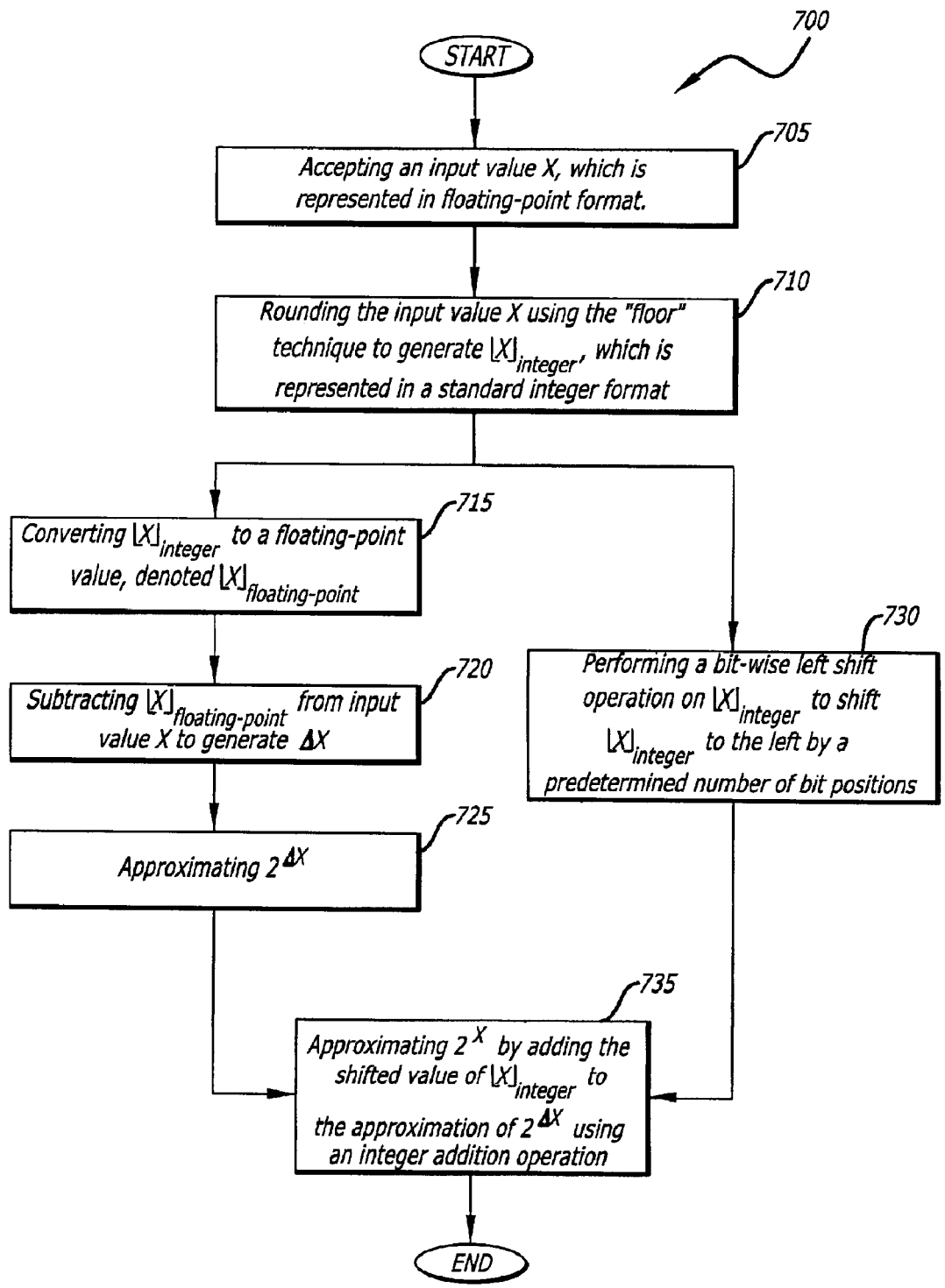
FIG. 7 is a flow diagram that generally outlines the process of approximating $2^X$ in accordance with one embodiment of the present invention.
Figure 7B:
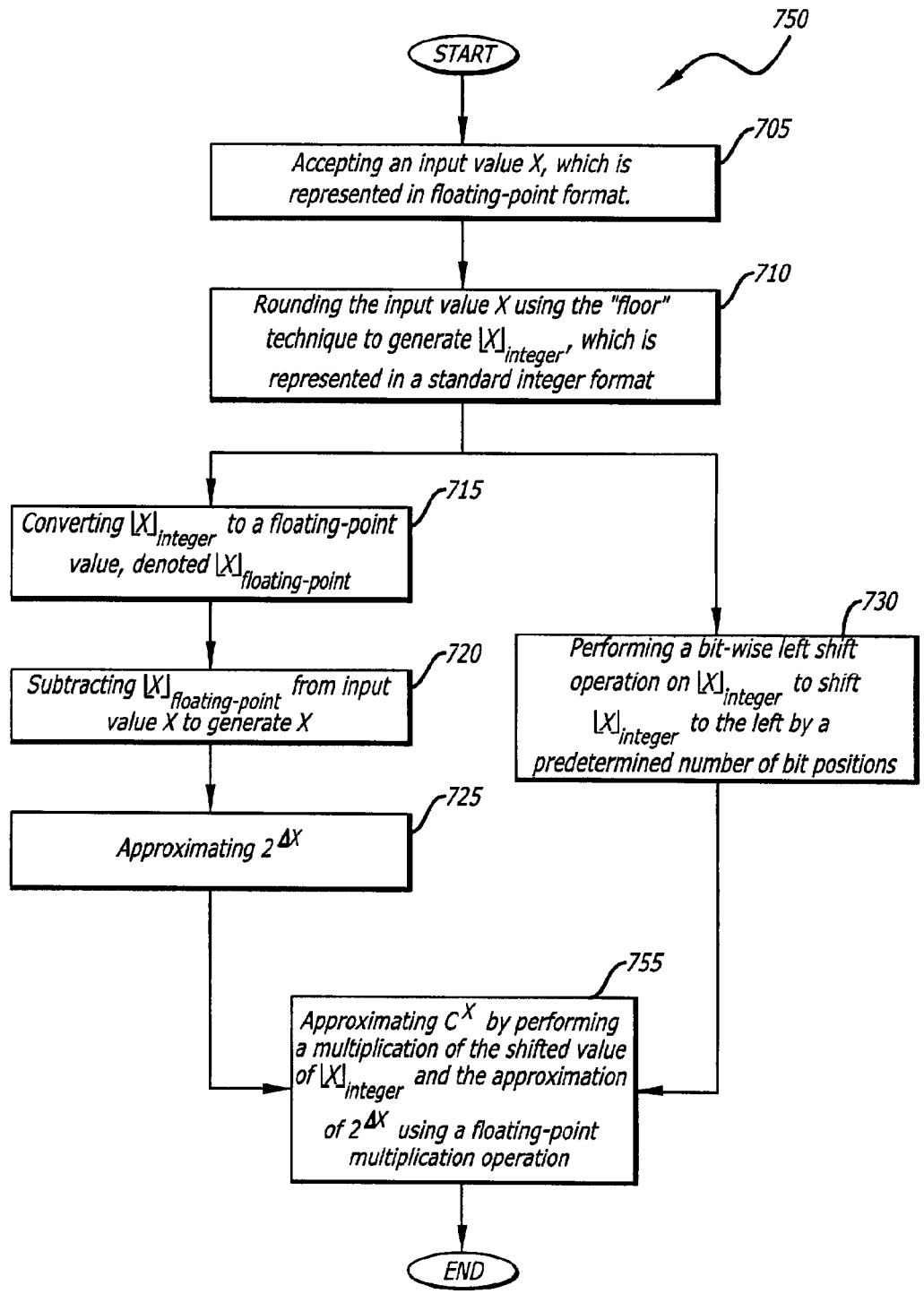

FIG. 7 is a flow diagram that generally outlines the process 700 of approximating the term $2^X$ in accordance with one embodiment of the present invention. An input value X is accepted in block 705. The input value is a real number and is represented in floating-point format.

In block 710, the input value X is rounded using the "floor" or "round to minus infinity $(-\infty)$" technique. The rounded value of X is denoted as $\lfloor X \rfloor_{integer}$ and is represented in a standard integer format. $\lfloor X \rfloor_{integer}$ is then converted to floating-point format, denoted $\lfloor X \rfloor_{floating-point}$ (block 715). A value of $\Delta X$ is calculated by subtracting $\lfloor X \rfloor_{floating-point}$ from input value X (block 720). After $\Delta X$ is calculated, an approximation of $2^{\Delta X}$ is calculated in block 725 using the aforementioned equations (5) and (6).

In block 730, a bit-wise left shift operation is performed on $\lfloor X \rfloor_{integer}$ to shift $\lfloor X \rfloor_{integer}$ to the left by a predetermined number of bit positions, so that the value of $\lfloor X \rfloor_{integer}$ is aligned with the exponent of the approximation of $2^{\Delta X}$. In one embodiment, $\lfloor X \rfloor_{integer}$ is shifted to the left by twenty-three bits to support the single precision floating-point data format as defined by IEEE Standard 754. In this embodiment, bits 23 to 31 of the shifted $\lfloor X \rfloor_{integer}$ value contain $\lfloor X \rfloor_{integer}$, and bits 0 to 22 of the shifted $\lfloor X \rfloor_{integer}$ value 336 contain a value of zero (0). For additional details, see FIGS. 4A and 4B and the description of these figures.

In block 735, the shifted $\lfloor X \rfloor_{integer}$ value is added to the approximation of $2^{\Delta X}$ using an integer addition operation. Accordingly, $\lfloor X \rfloor_{integer}$ is added to the exponent of the approximation of $2^{\Delta X}$. By adding $\lfloor X \rfloor_{integer}$ to the exponent of the approximation of $2^{\Delta X}$, an approximation of $2^X$ is calculated in accordance to principles set forth in the aforementioned equation (3).

While certain exemplary embodiments have been described and shown in accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A system comprising:

a first approximation apparatus to approximate a term $2^X$, wherein X is a real number, the first approximation apparatus includes:

a rounding apparatus to accept an input value (X), being the real number represented in a floating-point format, and to compute a first rounded value, $(\lfloor X \rfloor_{integer})$, by rounding the input value (X) using a floor technique for rounding downward to a nearest integer, wherein the first rounded value, $(\lfloor X \rfloor_{integer})$, is represented in an integer format, and an integer-to-floating-point converter to accept as input the first rounded value, $(\lfloor X \rfloor_{integer})$, and to convert the first rounded value, $(\lfloor X \rfloor_{integer})$, to a second rounded value, $(\lfloor X \rfloor_{floating-point})$, represented in floating-point format; and a central proccessing unit (CPU) coupled to the first approximation apparatus.

2. A system comprising:

a first approximation apparatus to approximate a term $2^X$, wherein X is a real number, the first approximation apparatus comprising (i) a rounding apparatus to compute an input value being the real number (X) represented in floating-point format, into a first rounded value, $(\lfloor X \rfloor_{integer})$ represented in an integer format, by rounding the input value (X) using a floor technique for rounding downward to a nearest integer, wherein the first rounded value, $(\lfloor X \rfloor_{integer})$, is represented in an integer format and (ii) a floating-point subtraction operator to compute the difference between the input value (X) and a second rounded value, $(\lfloor X \rfloor_{floating-point})$ being the input value (X) rounded using the floor technique and represented in a floating-point format; and a central proccessing unit coupled to the first approximation apparatus.

3. The system of claim 2, wherein the first approximation apparatus includes a shift-left logical operator to generate a shifted $\lfloor X \rfloor_{integer}$ value by shifting the first rounded value, $(\lfloor X \rfloor_{integer})$, to the left by a predetermined number of bit positions.

4. The system of claim 2, wherein the first approximation apparatus includes:

a second approximation apparatus to accept ΔX as input, to approximate $2^{\Delta X}$, and to return an approximation of $2^{\Delta X}$, wherein $\Delta X = X - \lfloor X \rfloor_{floating-point}$ and $\lfloor X \rfloor_{floating-point}$ is the input value, (X), rounded using the floor technique and represented in floating-point format.

5. The system of claim 4, wherein the second approximation apparatus computes the approximation of $2^{\Delta X}$ by applying Horner's method in calculating a sum of a plurality of terms of the Taylor series, $$2^{\Delta X} = \sum_{N=0}^{\infty} \frac{(\Delta X \ln 2)^N}{N!}.$$

6. The system of claim 2, wherein the first approximation apparatus includes:

an integer addition operator to accept a shifted $\lfloor X \rfloor_{integer}$ value, being the $\lfloor X \rfloor_{integer}$ value having undergone a bit-wise shift left operation by a predetermined number of bit positions, and an approximation of $2^{\Delta X}$ as input, and to perform an integer addition operation on the shifted $\lfloor X \rfloor_{integer}$ value and the approximation of $2^{\Delta X}$ to generate an approximation of $2^X$, wherein $\Delta X = X - \lfloor X \rfloor_{floating-point}$ and $\lfloor X \rfloor_{floating-point}$ is the input value, (X), rounded using the floor technique and is represented in floating-point format.

7. The system of claim 2, further comprising:

a third approximation apparatus to approximate a term $C^Z$, wherein C is a constant, positive number and Z is a real number, the third approximation apparatus using a floating-point multiplication operator to compute a product of $\log_2 C \times Z$, and feeding the product, $\log_2 C \times Z$, into the first approximation apparatus to generate an approximation of $C^Z$.

8. The computing system of claim 2 further comprising:

a memory to store a computer program that utilizes the first approximation apparatus and is executed by the central processing unit.

9. A machine-readable medium comprising instructions which, when executed by a machine, cause the machine to perform operations comprising:

a first code segment to perform computations to approximate the term $2^X$, wherein X is a real number;

a second code segment to accept an input value, (X), that is a real number represented in floating-point format, to compute a rounded value, $(\lfloor X \rfloor_{integer})$, by rounding the input value using a floor technique by rounding downward the input value to a nearest integer the rounded value represented in an integer format;

a third code segment to convert the rounded value to a second rounded value $\lfloor X \rfloor_{floating-point}$ represented in a floating point format.

10. The machine-readable medium of claim 9, wherein the first code segment includes:

a third code segment to accept ΔX as input and to generate an approximation of $2^{\Delta X}$, wherein $\Delta X = X - \lfloor X \rfloor_{floating-point}$ and $\lfloor X \rfloor_{floating-point}$ is the input value (X) rounded using a floor technique and is represented in floating-point format.

11. The machine-readable medium of claim 10, wherein the third code segment computes the approximation of $2^{\Delta X}$ by applying Horner's method in calculating a sum of a plurality of terms of the Taylor series, $$2^{\Delta X} = \sum_{N=0}^{\infty} \frac{(\Delta X \ln 2)^N}{N!}.$$

12. The machine-readable medium of claim 9, wherein the first code segment includes:

a fourth code segment to accept a shifted $\lfloor X \rfloor_{integer}$ value, being the $\lfloor X \rfloor_{integer}$ value having undergone a bit-wise shift left operation by a predetermined number of bit positions, and an approximation of $2^{\Delta X}$ as input, and to generate an approximation $2^X$ by performing an integer addition operation on the shifted $\lfloor X \rfloor_{integer}$ value, represented in integer format, and the approximation of $2^{\Delta X}$, represented in floating-point format, wherein $\Delta X = X - \lfloor X \rfloor_{floating-point}$ and $\lfloor X \rfloor_{floating-point}$ is the input value (X) rounded and represented in floating-point format.

13. The machine-readable medium of claim 9, further includes:

a fifth code segment to approximate a term $C^Z$, wherein C is a constant, positive number and Z is a real number, the fifth code segment computing a product of $\log_2 C \times Z$ and feeding the product, $\log_2 C \times Z$, into the first code segment to generate an approximation of $C^Z$.

14. A computing system, comprising:

a first approximation apparatus to approximate a term $2^X$, wherein an input value, (X), is a real number represented in floating-point format, the first approximation apparatus including an integer-to-floating-point converter to accept as input a first rounded value, ($\lfloor X \rfloor_{integer}$), associated with the input value, (X), and to convert the first rounded value, ($\lfloor X \rfloor_{integer}$), to a second rounded value, ($\lfloor X \rfloor_{floating-point}$), represented in a floating-point format;

a memory to store a computer program that utilizes the first approximation apparatus; and a central processing unit (CPU) to execute the computer program, the CPU is cooperatively connected to the first approximation apparatus and the memory.

15. The system of claim 14, wherein the first approximation apparatus comprises a rounding apparatus to accept the input value, (X) and to compute the first rounded value, ($\lfloor X \rfloor_{integer}$), by rounding the input value, (X) using a floor technique, the first rounded value, ($\lfloor X \rfloor_{integer}$), being represented in an integer format.

16. The system of claim 14, wherein the first approximation apparatus includes:

a floating-point subtraction operator to compute the difference between the input value, (X), and the second rounded value, ($\lfloor X \rfloor_{floating-point}$).

17. The system of claim 14, wherein the first approximation apparatus includes a shift-left logical operator to generate a shifted first rounded value by shifting the first rounded value, ($\lfloor X \rfloor_{integer}$), to the left by predetermined number of bit positions.

18. The system of claim 14, wherein the first approximation apparatus include:

a second approximation apparatus to accept $\Delta X$ as input, to approximate $2^{\Delta X}$, and to return an approximation of $2^{\Delta X}$, represented in floating-point format, wherein $\Delta X = X - \lfloor X \rfloor_{floating-point}$.

19. The system of claim 18, wherein the second approximation apparatus computes the approximation of $2^{\Delta X}$ by applying Horner's method in calculating a sum of a plurality of terms of the Taylor Series, $$2^{\Delta X} = \sum_{N=0}^{\infty} \frac{(\Delta X \ln 2)^N}{N!}.$$

20. The system of claim 14, wherein the first approximation apparatus includes:

an integer addition operator to accept a shifted $\lfloor X \rfloor_{integer}$ value, the $\lfloor X \rfloor_{integer}$ value after having undergone a bit-wise left shift operation so that $\lfloor X \rfloor_{integer}$ is located in a position corresponding to the exponent of a floating-point number, and an approximation of $2^{\Delta X}$ as input, and to perform an integer addition operation on the shifted $\lfloor X \rfloor_{integer}$ value, represented in integer format, and the approximation of $2^{\Delta X}$, represented in floating-point format, to generate an approximation of $2^X$, wherein $\Delta X = X - \lfloor X \rfloor_{floating-point}$ and $\lfloor X \rfloor_{floating-point}$.

21. The system of claim 14, further comprising:

a third approximation apparatus to approximate a term $C^Z$, wherein C is a constant and a positive number and Z is a real number, the third approximation apparatus using a floating-point multiplication operator to compute the product of $\log_2 C \times Z$, and feeding the product, $\log_2 C \times Z$, into the first approximation apparatus to generate an approximation of $C^Z$.

22. A computing system, comprising:

a first approximation apparatus to approximate a term $2^X$, wherein the input value, (X), is a real number represented in floating-point format, the first approximation apparatus including a floating-point subtraction operator to compute the difference between the input value (X) and a first rounded value, $\lfloor X \rfloor_{floating-point}$, wherein the first rounded value $\lfloor X \rfloor_{floating-point}$ is the input value (X) rounded using a floor technique that includes rounding the input value (X) downward to a nearest integer and is represented in a floating-point format;

a memory to store a computer program that utilizes the first approximation apparatus; and a central processing unit (CPU) to execute the computer program, the CPU is cooperatively connected to the first approximation apparatus and the memory.

23. A method comprising:

generating a first rounded value ($\lfloor X \rfloor_{integer}$) by an approximation apparatus coupled to a central processing unit;

generating a second rounded value ($\lfloor X \rfloor_{floating-point}$) by converting the first rounded value, represented in an integer format, to a floating-point format;

subtracting the second rounded value ($\lfloor X \rfloor_{floating-point}$) from an input value, (X), to generate $\Delta X$;

generating an approximation of $2^{\Delta X}$;

performing a bit-wise left shift to the first rounded value ($\lfloor X \rfloor_{integer}$) to generate a shifted value; and approximating $2^X$ by performing an integer addition operation to add the shifted value, represented in the integer format, to the approximation of $2^{\Delta X}$, represented in the floating-point format.

24. The method of claim 23, wherein generating an approximation of $2^{\Delta X}$ comprises:

applying Horner's method in calculating a sum of a plurality of terms of the Taylor series, $$2^{\Delta X} = \sum_{N=0}^{\infty} \frac{(\Delta X \ln 2)^N}{N!}.$$

25. The method of claim 23, wherein performing a bit-wise left shift operation to the first rounded value comprises:

shifting the first rounded value to the left by a predetermined number of bit positions so that the first rounded value occupies bit positions reserved for the exponent of a floating-point value.

26. The method of claim 23, wherein approximating $2^X$ comprises:
   performing an integer addition operation to add the shifted value to the approximation of $2^{\Delta X}$, such that the first rounded value, represented in integer format, is added to the exponent value of the approximation of $2^{\Delta X}$, represented in floating point format.

27. The method of claim 23, wherein the input data (X) is a real number represented in a floating point format.

* * * * *